United States Patent [19]
Bede

[11] 4,321,070
[45] Mar. 23, 1982

[54] WHISTLE TO SIGNAL CLOGGED AIR FILTER

[75] Inventor: James D. Bede, Bay Village, Ohio

[73] Assignee: Bede Industries, Inc., Cleveland, Ohio

[21] Appl. No.: 180,338

[22] Filed: Aug. 22, 1980

[51] Int. Cl.³ .............................................. B01D 46/00
[52] U.S. Cl. ....................................... 55/274; 116/70
[58] Field of Search ...................... 55/270, 274; 116/70

[56] References Cited

U.S. PATENT DOCUMENTS

| 1,770,094 | 7/1930 | Wickersham | 55/274 |
| 2,682,250 | 6/1954 | Ulrich | 55/274 |
| 3,027,865 | 4/1962 | Kautz et al. | 55/274 |
| 3,916,818 | 11/1975 | Barr | 116/70 |

Primary Examiner—Robert I. Smith
Attorney, Agent, or Firm—Maky, Renner, Otto & Boisselle

[57] ABSTRACT

A simple two-piece reusable plastic whistle which, when installed in an air filter, emits a shrill tone to signal a predetermined clogged condition of the filter at which time the filter should be cleaned or replaced.

5 Claims, 2 Drawing Figures

U.S. Patent   Mar. 23, 1982   4,321,070

WHISTLE TO SIGNAL CLOGGED AIR FILTER

BACKGROUND OF THE INVENTION

It is known as from Davies U.S. Pat. No. 2,753,831 to provide an air filter clogging warning apparatus in which a whistle is secured within a tube which extends through the filter, the tube being affixed in the filter by a funnel shaped portion at its upstream end and a washer affixed adjacent its downstream end. Said patent also contemplates the provision of a screen over the mouth of the funnel shaped end of the tube.

It is also known to provide whistles and vibrating reed warning devices in connection with carburetor air intake filters to signal when the filters are clogged and in need of replacement as exemplified by the following U.S. Pat. Nos.: Wickersham 1,770,094; Smith 1,863,456; and Nowicki 3,529,407; 3,699,749; 3,737,900; and 3,740,931.

SUMMARY OF THE INVENTION

In contradistinction to known whistles for providing an audible signal to denote a clogged condition of a forced air filter, the present whistle is characterized by its simple two-part construction molded of plastic material with a first flanged part being inserted through the filter from the upstream side thereof and with the other disc-like part being snapped over the downstream end of the first part to constitute a flange on the downstream side of the filter and to form a whistle at the downstream end of the filter which emits a shrill tone when the pressure drop across the filter reaches a predetermined value. When a clogged condition of the filter is indicated, the two-part whistle herein may be quickly and easily removed from the clogged filter and inserted into a new filter for reuse.

DETAILED DESCRIPTION OF A PREFERRED EMBODIMENT

Figure 1:
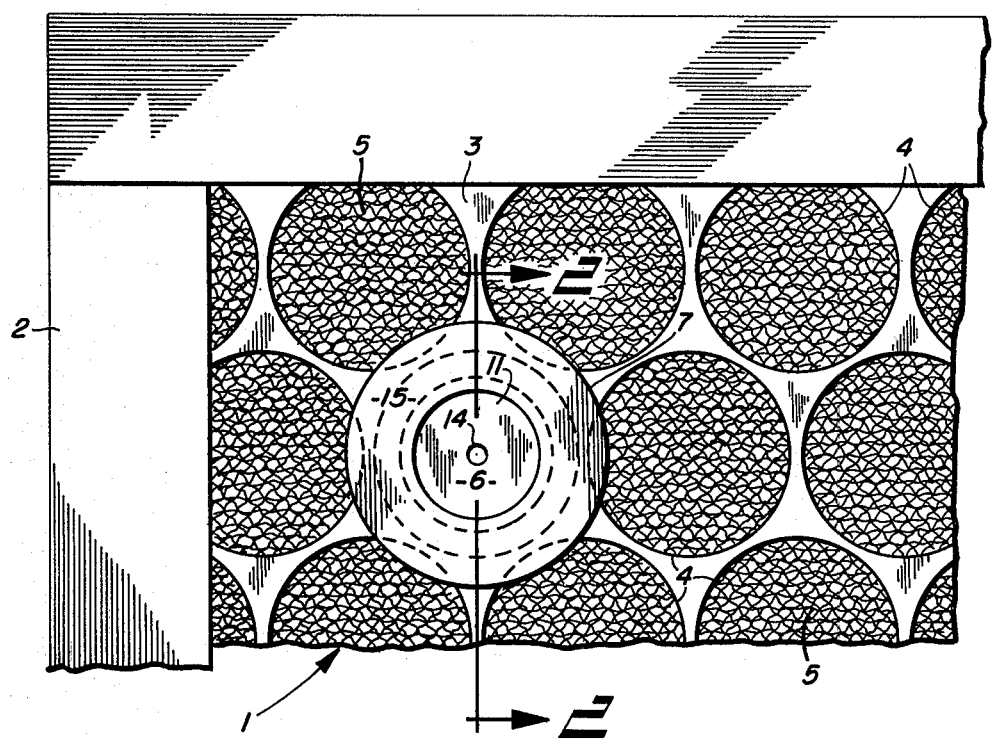
FIG. 1 is a fragmentary elevation view of an air filter having the whistle according to the present invention installed therein.
Figure 2:
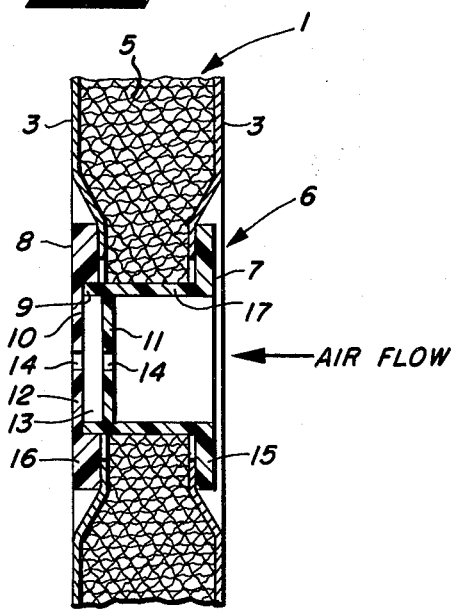
FIG. 2 is a cross section view taken along the line 2—2 of FIG. 1

The filter 1 herein shown by way of example is a viscous throw-away filter having a rectangular frame 2 (often 16"×20"×1" or 16"×25"×1") including parallel thin grids 3 with large openings 4 between which a filter medium 5 such as fiberglass is contained, the filter medium 5 being coated with a viscous material to collect dust and other particles from air flowing through the filter 1. Filters 1 of this construction are well known and are in prevalent use in air conditioning systems and in forced air heating systems in which a blower or fan (not shown) draws air through the filter 1 in the direction shown in FIG. 2, the filter medium 5 being effective to collect dust, etc. from air flowing through the filter 1 from the upstream side to the downstream side thereof.

As known, a forced air heating or air conditioning system works progressively harder as the air filter 1 becomes more and more clogged and hence to save energy and to maintain the efficiency of the system it is desirable to replace a viscous throw-away filter 1 when the resistance thereof exceeds a predetermined value. The whistle 6 herein emits a shrill tone when the filter 1 becomes inefficient, for example, when the filter is 60% to 70% obstructed.

The whistle 6 is of simple, inexpensive, and efficient construction comprising molded plastic parts 7 and 8 which at the downstream side of the filter 1 have a snugly interfitted tubular lip 9 and recess 10 defining the axially spaced apart walls 11 and 12 of a resonating chamber 13. The walls 11 and 12 have coaxial central orifices 14 which in conjunction with chamber 13 constitute a whistle to emit an audible signal when the pressure drop across the filter 1 increases to a predetermined value. The parts 7 and 8 define flanges 15 and 16 which overlie opposite sides of the filter 1 and compress the ilter medium 5 therebetween and around the cylindrical portion 17 of the part 7 which is inserted through an opening 4 in each grid 3. The whistle 6 is shown installed in a conventional filter 1 of 1" thickness but it may be installed, without change in dimensions, in a filter of greater thickness, such as 2" or more. The whistle 6 is preferably installed at the center of the filter 1 but is here shown near a corner of the filter 1 for convenience of illustration.

As a typical example, the walls 11 and 12 are of 0.062" thickness and the orifices 14 are of 0.125" diameter and for good results the chamber 13 is of 0.125" axial width and 0.875" diameter. The flanges 15 and 16 are of 1.75" diameter and constitute a negligible obstruction of the filter 1 (less than 1%).

Typically, a new filter 1 at rated flow may have a resistance of 0.02 inch $H_2O$ or less and when the filter 1 becomes about 50% obstructed, i.e., a pressure drop of 0.23 to 0.25 inch $H_2O$, the whistle 6 will emit a relatively soft tone which may be audible near the location of the filter but when the filter becomes 60 to 70% obstructed within a week or so with a pressure drop of about 0.5 inch $H_2O$, the whistle 6 will emit a loud shrill tone thus to signal that the filter should be replaced in the case of a viscous throw-away filter or should be shaken or vacuumed as in the case of a dry type reusable filter.

The embodiments of the invention in which an exclusive property or privilege is claimed are defined as follows:

1. A whistle to signal a predetermined clogged condition of an air filter comprising a first part having a flange adapted to engage a minute portion of the upstream side of a filter and a cylindrical extension from said flange adapted to extend through the filter medium; and a second part of disc-like form having snug removable interengagement with the downstream end portion of said extension and constituting a flange adapted to engage a minute portion of the downstream side of the filter and to compress the filter medium between said flanges; said parts defining therebetween a cylindrical chamber including axially spaced apart end walls each having a central orifice therethrough operative in conjunction with said chamber to emit an audible signal upon predetermined increase in pressure drop across the filter.

2. The whistle of claim 1 wherein a tubular lip of said end portion from the end wall of said first part bounds said chamber and has such snug interengagement with a cylindrical recess in said second part of which the bottom constitutes the end wall of said second part.

3. The whistle of claim 2 wherein the end of said lip engages the bottom of said recess to determine the axial spacing of said end walls.

4. The whistle of claim 3 wherein said orifices are of diameter substantially equal to the axial spacing of said walls.

5. The whistle of claim 4 wherein said chamber is of diameter several times that of said orifices.

* * * * *